No. 792,235. PATENTED JUNE 13, 1905.
W. J. PATTON.
FRUIT EVAPORATOR.
APPLICATION FILED SEPT. 3, 1904.
4 SHEETS—SHEET 1.
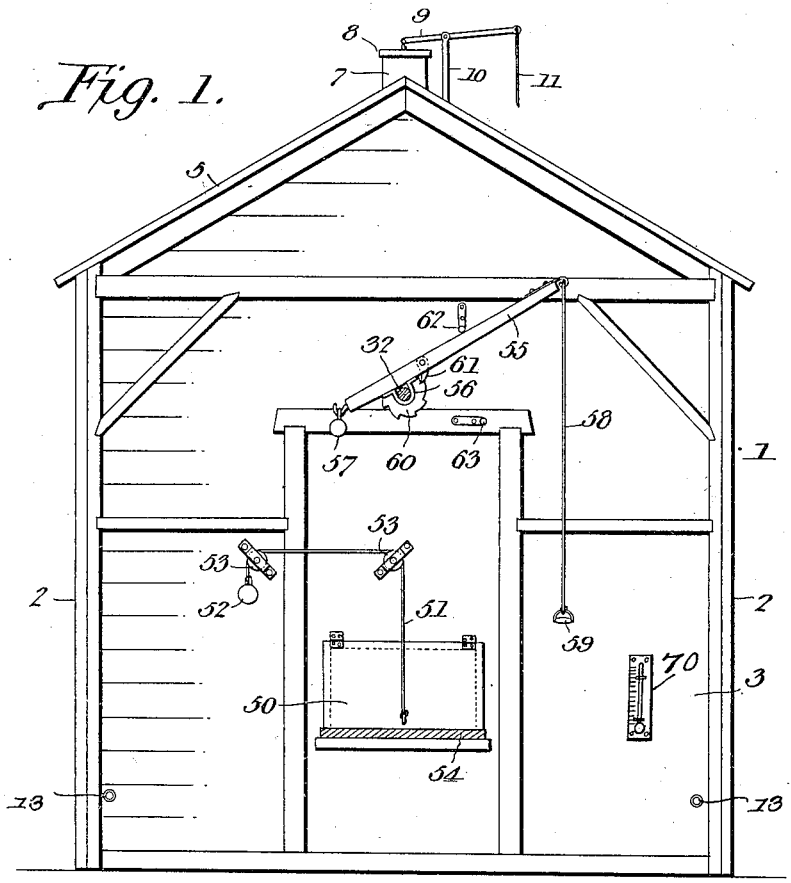
Fig. 1.
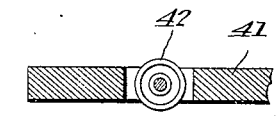
Fig. 7.
Fig. 6.
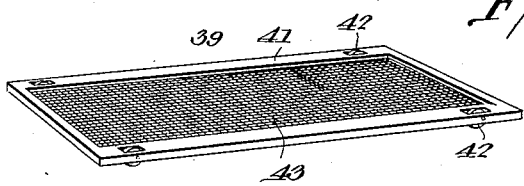
William J. Patton,
Inventor,
Witnesses:
by C. A. Snow & Co.,
Attorneys.

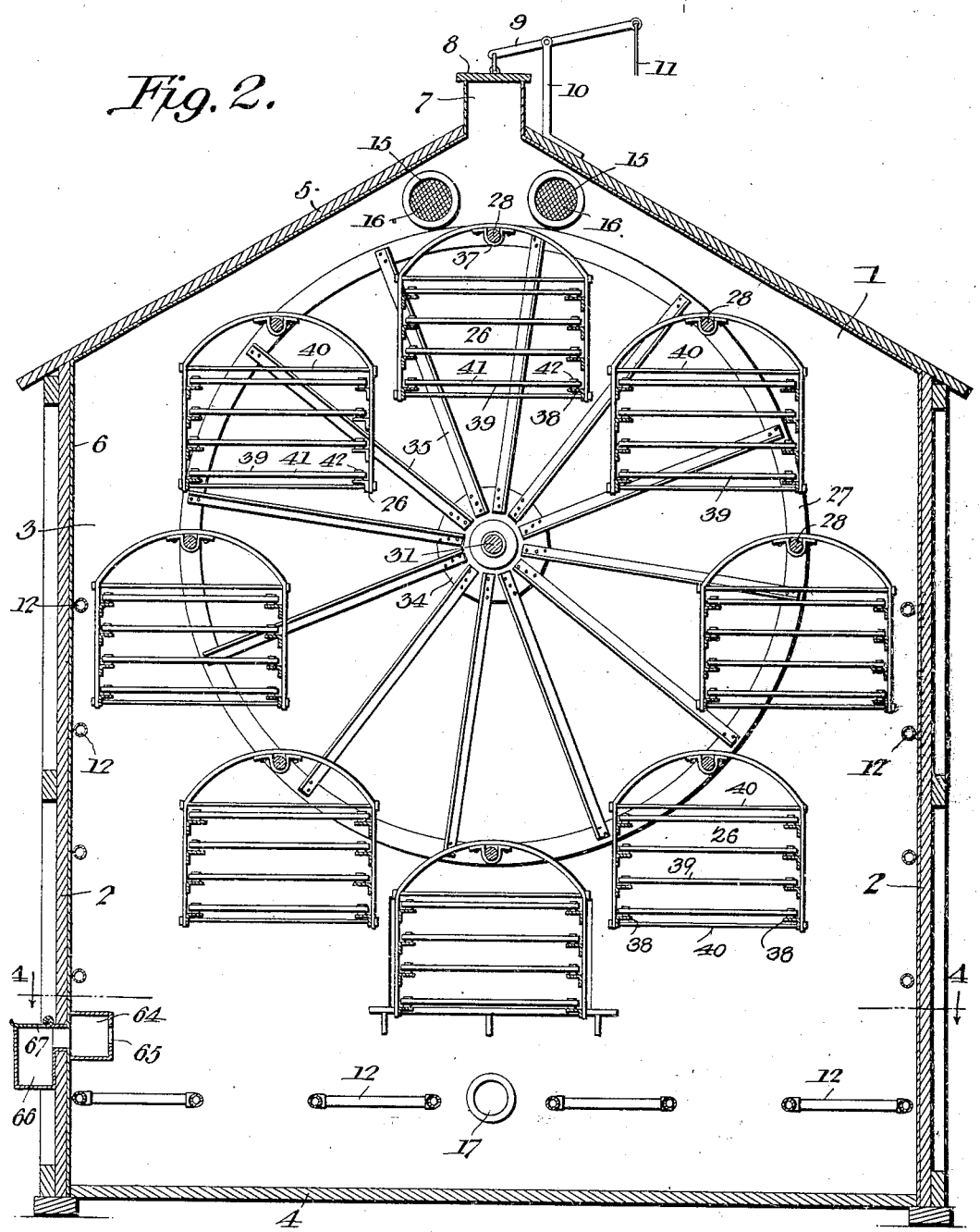

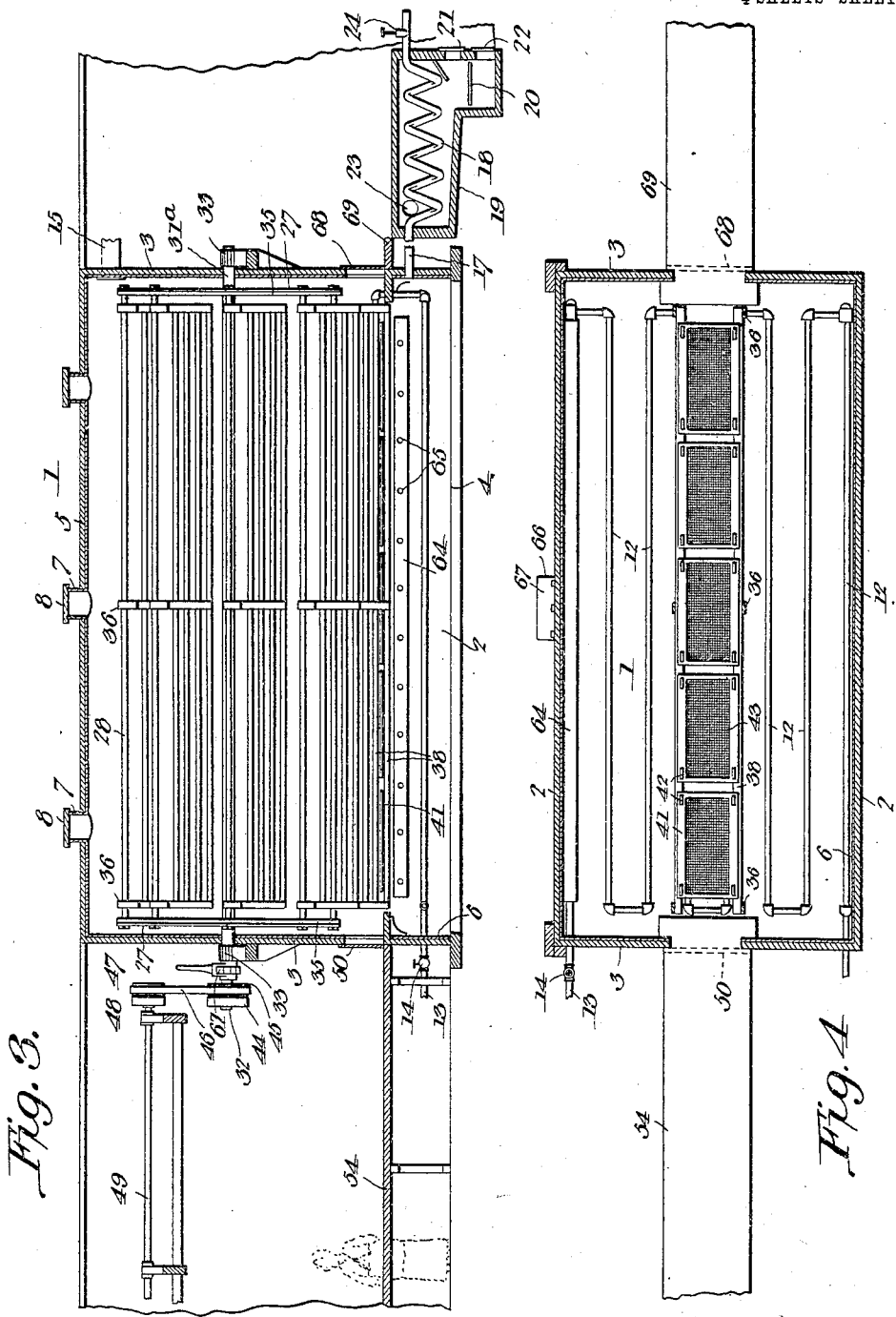

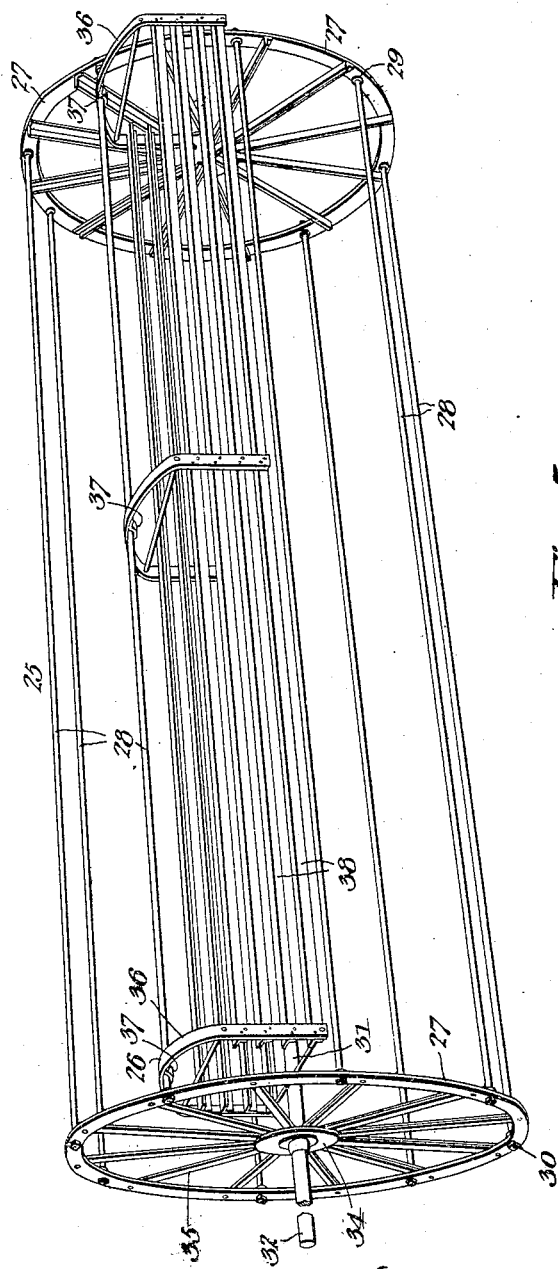

No. 792,235. Patented June 13, 1905.

UNITED STATES PATENT OFFICE.

WILLIAM J. PATTON, OF SPRINGDALE, ARKANSAS.

FRUIT-EVAPORATOR.

SPECIFICATION forming part of Letters Patent No. 792,235, dated June 13, 1905.

Application filed September 3, 1904. Serial No. 223,261.

*To all whom it may concern:*

Be it known that I, WILLIAM J. PATTON, a citizen of the United States, residing at Springdale, in the county of Washington and State of Arkansas, have invented a new and useful Fruit-Evaporator, of which the following is a specification.

This invention relates to fruit-evaporators. The object of the invention is in a rapid, economical, and thoroughly feasible and practical manner evenly and perfectly to evaporate large quantities of fruit; to facilitate the positioning of the fruit within the evaporator and its removal therefrom; to insure an even and constant application of heat to all of the contained fruit; to secure removal of all moisture in the atmosphere of the evaporator resulting from the condensation of the heated air upon the fruit and from the evaporation of the juices therefrom; to insure the retention of the flavor of the fruit; to obviate overdrying; to secure perfect and thorough bleaching and at the same time the destruction of any spores or germs upon the fruit or present in the evaporating-chamber, which would otherwise result in the ultimate degeneration or possible decay of the fruit, and generally to improve the methods commonly in vogue in evaporating fruits.

With the above and other objects in view, as will appear as the nature of the invention is better understood, the same consists in the novel construction and combination of parts of an apparatus for evaporating fruit, as will be hereinafter fully described and claimed.

In the accompanying drawings, forming a part of this specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof.

In the drawings, Figure 1 is a view in elevation, taken from one end of an evaporating chamber or plant constructed in accordance with the present invention. Fig. 2 is a view in vertical transverse section through the evaporating-chamber. Fig. 3 is a view in vertical longitudinal section. Fig. 4 is a view in horizontal section on the line 4 4 of Fig. 2 and looking in the direction of the arrow thereon. Fig. 5 is a perspective detail of a reel from which the fruit-evaporating carriers and trays are suspended. Fig. 6 is a perspective detail view of one of the evaporating-trays. Fig. 7 is an enlarged detail view in section of a portion of one of the evaporating-trays.

Referring to the drawings and to Figs. 1 and 2 thereof, 1 designates the evaporating chamber or building, the same comprising sides 2, ends 3, bottom 4, and roof 5, the latter being of the ordinary hipped character. The roof and bottom may be constructed of wood, and, if preferred, these parts may be covered with metal to render them air-tight. The sides 2 are suitably lagged at 6 to prevent escape of heat and entrance of cold. In other words, it is designed that the chamber shall be air-tight for reasons that will presently appear. The top of the chamber, as clearly shown in Fig. 3, is provided with a plurality of escape-pipes 7, which are normally closed by dampers 8, each damper having connected with it one end of a lever 9, fulcrumed intermediate of its ends upon a standard 10, secured upon the roof, a cord 11 or other flexible connection secured to the free end of the lever and extending to the ground serving as a means to open the damper as requisite, the weight of the damper operating to close it when strain from the cord is removed. Arranged adjacent to the bottom of the chamber and along the sides thereof are convoluted steam-pipes 12, which are supplied with steam from a suitable source through a feed-pipe 13, (clearly shown in Fig. 3,) the supply of steam to the coils being controlled by a valve 14 on the supply-pipe. As shown in Fig. 2, the steam-coils extend to a point adjacent to the roof, and under ordinary circumstances this disposition of the pipes will be found thoroughly effective for securing the objects sought; but it is to be understood that, if preferred, they may be extended clear to the roof or be disposed on the under side of the roof itself and still be within the scope of the invention.

In the operation of evaporating there will be present a certain degree of moisture in the atmosphere of the chamber, which will have to be removed in order to cause the heat to operate properly upon the fruit; otherwise the product would be soggy and not properly evaporated, and the result would be the output of an article which would soon deteriorate and spoil. To obviate this defect, there is combined with one end of the chamber and near its top two pipes or ducts 15, (clearly shown in Fig. 3,) the inner ends of which are covered by a suitable screen-mesh 16, which will prevent the entrance of insects to the chamber, the other ends of the pipes being connected with a suitable suction-pump, (not shown,) which will operate to withdraw the atmosphere of the chamber, and with it all contained moisture and vapors given off by the fruit. In order to keep the supply of air within the chamber at a fixed quantity and constant, and without lowering its temperature, there is provided an air-supply pipe 17, (more clearly shown in Fig. 3,) one end of which enters the chamber near its bottom. The intermediate portion of the air-supply pipe is formed into coils or convolutions 18, and these are disposed within a suitable furnace 19, provided with grate-bars 20, fire and ash doors 21 and 22, respectively, and with a smoke hole or outtake 23.

The end of the air-supply pipe that projects beyond the furnace is provided with a valve 24, preferably of the slide type, by which the supply of air to the pipe may be controlled, it being a desideratum that the quantity of air fed to the chamber shall not exceed the amount withdrawn. In effect it will be generally desired to have the supply of air less than the amount withdrawn in order to set up a partial vacuum in the chamber, which reduction in pressure will cause the water contained in the flavoring-juice of the fruit to be drawn to the surface, whence it is dispelled by the heated air of the chamber. This vacuum may be varied according to the character of the fruit being treated, as it will be apparent that fruit containing a large quantity of juice will require a nearer complete vacuum than one containing a small quantity of juice. By the double action of the heat and vacuum the evaporation of the fruit is rapidly and perfectly secured, and at the same time its flavor is not injured in the least, which frequently results where heat alone is relied upon in extracting the moisture. Furthermore, the fruit will be evenly dried throughout, and its outer or exposed surfaces will not become hard and dry, but will be soft and pliable at the completion of the operation.

The mechanism for presenting the fruit to the action of the heated air within the evaporating-chamber comprises a reel (designated generally 25, Fig. 5) and a plurality of drying-tray supports (designated generally 26) carried thereby. The reel may be constructed in any suitable manner, and that shown herein is exhibitive of one form which may be employed and comprises two annular heads 27, connected and stayed by a series of rods 28, in this instance eight, although this number may be increased or diminished, if found necessary or desirable. The rods may be combined with the heads 27 in any preferable manner, in this instance by the employment of collars or stops 29, which bear against the inner sides of the heads, and nuts 30, screwed upon the projecting ends of the rods and bearing against the outer sides of the heads. The reel is supported for rotation upon a shaft 31, the terminals $31^a$ and 32 of which project through the ends of the compartment and work in bearings 33, suitably supported thereby. Mounted upon the shaft adjacent to each end is a head or disk 34, to which are secured the inner ends of a series of radial bars or arms 35, preferably of angle-iron, the outer ends of which are riveted or otherwise secured to the heads.

The tray supports or carriers, to which reference has been made and of which there are shown in this instance eight, correspond in number to the rods of the reel and may be of any preferred form, that shown herein being exhibitive of one embodiment that may be employed and found thoroughly effective for the purposes designed. As each of the tray-supports is a counterpart of the other, a description of one will serve for all. The support comprises in this instance three bails 36, which are mounted for a swinging movement upon their supporting-rod 28 through the medium of straps 37, which, as clearly shown in Fig. 2, practically encircle the bar and are riveted or otherwise secured to the under side of the bails. The sides of the bails are shown as straight and their tops curved, and the series of bails is connected through the medium of angle-bars 38, which, as clearly shown in Figs. 2 and 5, are riveted to the inner sides of the bails and serve as tracks for the fruit-trays 39, one of which is shown in detail in Fig. 6. As herein shown, each tray-support is provided with four pairs of tracks 38; but, as will be obvious, this number may be increased should it be desired to augment the capacity of the apparatus or decreased, if so desired, and, as this will be obvious, any detailed illustration thereof is deemed unnecessary. In order to hold the sides of the bails properly spaced apart and prevent spreading when the loaded trays are placed within the supports, spacing-rods 40 are employed, in this instance two, disposed, respectively, near the tops and bottoms of the bail-arms.

The tray 39, of which there may be any desired number employed, comprises a rectangular frame 41, near each end of which, on opposite sides, are arranged rollers 42 to travel upon the tracks 38. The frame may be made of any suitable material, preferably of metal, and the surface 43, upon which the fruit rests, is made of some vegetable material such as ratan, reed, or the like, these materials being capable of withstanding the deleterious action of the acids of the fruit-juices, whereas if metal be employed it will rapidly oxidize and soon become useless and further damage the fruit by staining it. While the form of tray herein shown is one that will be found thoroughly effective for the purpose designed, it is to be understood that the invention is not to be limited to this form alone, as any other construction adapted for the purpose may be employed without departing from the spirit thereof.

As clearly shown in Fig. 3, one of the trunnions 32 carries two pulleys 44 and 45, the former of which is a loose pulley and the latter a tight pulley, and these pulleys are driven by a belt 46, which passes around pulleys 47 and 48 on counter-shaft 49, driven from a suitable source of power not necessary to be shown. The pulley 47 will be a tight pulley and the pulley 48 a loose pulley, and suitable mechanism will be employed for shifting the belt to the appropriate pulley in starting and stopping the reel.

One of the compartments is provided with an outward-swinging door 50, with which connects one end of a chain or rope 51, the opposite end of which carries a counterweight 52, the intermediate portion of the rope or chain being placed around sheaves 53, secured in any suitable manner to the outer wall of the compartment. This door closes down directly upon a packing-table 54, which is disposed in exact alinement with the lower pair of tracks of the tray-supports, so that when the tray is filled with fruit by opening the door 50 the tray may be rolled directly upon the said tracks, the first tray being pushed to the rear end of the reel as the successive trays are entered, as will be readily understood by reference to Fig. 3. When the lowest pair of tracks is filled, the trays are then lifted and placed upon the next higher track, and so on until all of the tracks of one of the supports are filled. To bring the next succeeding support opposite the door or packing-table, means is provided operable by hand to impart a step-by-step motion to the reel and consisting of a lever 55, which is combined for rotary movement with the terminal 32 of the shaft 31 through the medium of a yoke 56. One end of this lever carries a counterweight 57, and the other end has connected with it a cord or chain 58, the lower end of which is provided with a handle 59, disposed within convenient reach of the operator at the packing-table. Keyed to the terminal 32 is a ratchet-wheel 60, having in this instance eight teeth, corresponding in number to the tray-supports, and these teeth are adapted to be engaged by a gravity-pawl 61, carried by the lever. The arc movement of the free end of the lever is controlled by stops 62 and 63, which are spaced such distance apart that when the lever is moved into contact with stop 63 the reel will be moved just a distance sufficient to bring the succeeding tray-support opposite the packing-table. By this simple expedient the operator will always be able with certainty and ease to operate the reel to present the tray-support opposite the packing-table, thereby facilitating the work of loading the trays upon the tracks. Of course it is to be understood that when the trays are being positioned the belt 46 will be shifted to the loose pulleys, thereby placing the reel entirely under the manual control of the operator.

As stated at the outset of the specification, it is a desideratum while the fruit is being dried to bleach it and at the same time to sterilize or destroy any spores or germs present in the compartment or on the fruit that would tend to deteriorate the latter, and this is effected by employing a trunk or conduit 64, which is arranged along one side of the compartment adjacent to its bottom and is provided with a series of orifices 65, as clearly shown in Fig. 3. Exteriorly of the compartment is arranged a furnace in the form of a box or casing 66, provided with a hinged lid or cover 67, and in this furnace is placed sulfur, the fumes of which when ignited pass into the trunk and thence through the orifices 65 into the compartment, through which it permeates and by the agitation of the air caused by the rotation of the reel effects a thorough dissemination of the fumes and consequent even treatment of all the fruit. While but one trunk is herein shown, it is to be understood that a duplicate may be placed on the opposite side of the compartment, or, if desired, the trunk may be extended entirely around the four walls of the compartment, and as this will be readily apparent illustration thereof is omitted.

The end of the compartment opposite that provided with the door 50 has a similar door 68 and a packing-table 69, similar to the table 54 and disposed in exact alinement therewith. It is through the door 68 that the trays are removed from the compartment, and this may be effected by opening the doors and by the use of a pole pushing the trays from the door 50 to the door 68, through which they may be withdrawn by hand and deposited onto the table 69.

In the operation of the apparatus the supports are filled with the trays loaded with fruit in the manner above described, and the door 50 is then closed. It is intended that this door and the door 68 shall form an airtight juncture with their openings or with the outer face or wall of the compartment. The dampers are then opened, and the reel is started, and by observing a barometer 70, conveniently located upon the chamber and communicating with the interior thereof, the operator can determine the degree of humidity of the chamber. When a certain portion of the moisture has escaped through the pipes 7, the dampers 8 are closed, and the suction-pump connecting with the pipes 15 is started, thereby rapidly withdrawing the air and moisture from the chamber. As rapidly as the air is withdrawn fresh hot air is drawn through the air-supply pipe 17, its volume being controlled by a valve 24, and it is to be understood, of course, that there will be a fire in the furnace 19, which will heat the air, and thus prevent any possible lowering of the temperature of the chamber. At the same time steam is supplied to the coils 12, the flow thereof being controlled by the valve 14. As the reel revolves the air within the chamber is constantly agitated, so that the temperature at the bottom of the chamber will be substantially the same as that at the top, and the result will be an even and perfect drying of the fruit. During this drying operation the sulfur fumes are allowed to pass to the chamber, and thus effect the bleaching of the fruit and the destruction of any germs or decay thereon. As before stated, the supply of air may be somewhat less than the amount withdrawn, and this will result in the formation of a partial vacuum, which will cause the rapid exudation of the water contained in the fruit to its surface, where by contact with the heated air it is rapidly vaporized and drawn out through the pipes 5. When the process has been carried on a sufficient length of time to effect the drying or evaporation, the trays are removed and the reel is recharged in the manner already described.

It will be seen that when the carriers are loaded with trays filled with prepared fruit and are in motion they operate as fans to drive the moisture off from the fruit as rapidly as it appears upon the surface and out of the chamber, thereby in a positive and effective manner facilitating the operation of evaporation.

It will be seen from the foregoing description that although the apparatus of this invention is exceedingly simple in construction it combines in a thoroughly feasible and practical manner all of the elements necessary to secure the rapid and thorough drying of the fruit and its bleaching.

In carrying the invention into effect various changes in the construction and mode of assembling the parts may be adopted without departing from the spirit of the invention or sacrificing any of the advantages thereof.

Having fully described the invention, what is claimed is—

1. A fruit-evaporator comprising a chamber, a reel mounted therein and substantially commensurate in length therewith, tray-carriers having longitudinal tracks and suspended for swinging movement from the reel, and trays adapted to be supported by the tracks.

2. A fruit-evaporator comprising a chamber, a reel mounted therein and substantially commensurate in length therewith, tray-carriers having longitudinal tracks and suspended for swinging movement from the reel, trays adapted to be supported by the tracks, a feed and a discharge door, and means for bringing the tray-carriers opposite the doors.

3. A fruit-evaporator comprising a chamber, means for hermetically sealing the same, means arranged near the top of the chamber to remove air therefrom to form a partial vacuum within the chamber, means for supplying heated air to compensate for that withdrawn, means for supplying a bleaching and germicidal agent to the chamber, a reel mounted within the chamber and substantially commensurate in length therewith, tray-carriers having longitudinal tracks and suspended for swinging movement from the reel, and trays adapted to be supported by the tracks.

4. A fruit-evaporator comprising a chamber, a reel mounted therein and substantially commensurate in length therewith, tray-carriers having longitudinal tracks and suspended for swinging movement from the reel, trays adapted to be supported by the tracks, a feed and a discharge door combined with the chamber, and means for imparting a step-by-step movement to the reel to bring the tray-carriers opposite the doors.

5. A fruit-evaporator comprising a chamber, rotary tray-supports arranged therein, means for heating the chamber, means for creating a partial vacuum within the chamber, means for supplying heated air to compensate for that withdrawn, and means for supplying a bleaching and germicidal agent to the chamber embodying a perforated trunk arranged interiorly of the chamber, and a furnace arranged exteriorly thereof and communicating with the trunk.

In testimony that I claim the foregoing as my own I have hereto affixed my signature in the presence of two witnesses.

WILLIAM J. PATTON.

Witnesses:
  M. H. COOK,
  JESSE PATTON.